United States Patent
Teshima et al.

[11] Patent Number: 5,734,773
[45] Date of Patent: Mar. 31, 1998

[54] MULTICORE PLASTIC OPTICAL FIBER FOR LIGHT SIGNAL TRANSMISSION

[75] Inventors: Shinichi Teshima, Yokohama; Hajime Munekuni, Kisarazu; Shigeki Katsuta, Yokohama, all of Japan

[73] Assignee: Asahi Kasei Kogyo Kabushiki Kaisha, Osaka, Japan

[21] Appl. No.: 750,333

[22] PCT Filed: Apr. 27, 1995

[86] PCT No.: PCT/JP95/00837

§ 371 Date: Nov. 22, 1996

§ 102(e) Date: Nov. 22, 1996

[87] PCT Pub. No.: WO95/32442

PCT Pub. Date: Nov. 30, 1995

[30] Foreign Application Priority Data

May 24, 1994 [JP] Japan .................................. 6-109785

[51] Int. Cl.$^6$ .................................................. G02B 6/02
[52] U.S. Cl. .................. 385/126; 385/142; 385/143; 385/145; 385/123
[58] Field of Search ..................... 385/126, 127, 385/128, 114, 115, 116, 142, 143, 144, 145, 123

[56] References Cited

U.S. PATENT DOCUMENTS

| | | | |
|---|---|---|---|
| 4,295,739 | 10/1981 | Meltz et al. | 385/126 X |
| 4,547,040 | 10/1985 | Yamamoto et al. | 385/143 X |
| 4,564,263 | 1/1986 | Ueba et al. | 385/143 X |
| 4,653,852 | 3/1987 | Suzuki et al. | 385/126 X |
| 4,768,857 | 9/1988 | Sakunaga et al. | 385/126 X |
| 4,812,012 | 3/1989 | Terada et al. | 385/126 X |
| 4,828,349 | 5/1989 | Nakasuji | 385/126 X |
| 4,842,365 | 6/1989 | Terada et al. | 385/123 X |
| 4,973,129 | 11/1990 | Fukuzawa et al. | 385/126 X |
| 5,212,756 | 5/1993 | Eoll | 385/114 |
| 5,446,821 | 8/1995 | Nonaka et al. | 385/128 |
| 5,457,762 | 10/1995 | Lochkovic et al. | 385/128 X |
| 5,524,164 | 6/1996 | Hattori et al. | 385/114 |
| 5,561,730 | 10/1996 | Lochkovic et al. | 385/114 |
| 5,608,835 | 3/1997 | Ono et al. | 385/126 |

FOREIGN PATENT DOCUMENTS

| | | | |
|---|---|---|---|
| 62-265606 A | 11/1987 | Japan | 385/126 X |
| 5-134120 A | 5/1993 | Japan | 385/126 X |
| 5-341147 A | 12/1993 | Japan | 385/126 X |

OTHER PUBLICATIONS

I. Munekuni, S. Katsuta and S. Teshima, *Proceedings of Third International Conference on Plastic Optical Fibres & Applications* (POF '94), Oct. 26–28, 1994, Yokohama, Japan, pp. 148–151.

*Primary Examiner*—Brian Healy
*Attorney, Agent, or Firm*—Pennie & Edmonds LLP

[57] ABSTRACT

The present invention relates to a multicore plastic optical fiber for light signal transmission comprising 7 or more cores having a diameter of 50 to 200 μm which are covered with a cladding resin having a refractive index lower than that of the core resin by 0.005 to 0.04. The multicore plastic optical fiber of the present invention has low transmission loss in a broad transmission bandwidth and exhibits excellent bending characteristics. Therefore, it is suitable for transmission at a high speed in short and medium distances.

4 Claims, 2 Drawing Sheets

MULTICORE PLASTIC OPTICAL FIBER FOR LIGHT SIGNAL TRANSMISSION

TECHNICAL FIELD

The present invention relates to a multicore plastic optical fiber for light signal transmission which has low transmission loss in a broad transmission bandwidth and does not experience greatly increased transmission loss even during bending of the fiber.

BACKGROUND OF THE INVENTION

Heretofore, a plastic optical fiber cable prepared by covering a single core plastic optical fiber with a thermoplastic resin such as polyethylene, by thinly covering a core having a diameter of about 0.5 to 1.5 mm with a cladding material in a concentric configuration, is employed for optical communication. Plastic Optical Fiber and Applications Conference '92, PROC., 3 (1992) reports that conventional step index type single core plastic optical fibers have a transmission bandwidth of 40 MHz when the fiber length is 100 meters and the launch numerical aperture of the light source is 0.65. However, when the light source launch numerical aperture is collimated to 0.01, its transmission bandwidth becomes 115 MHz in the case of a 100-meter long fiber.

A bundle cable prepared by covering a bundle of some tens of thin plastic optical fibers having a diameter of 0.125 to 0.25 mm with a thermoplastic resin has been also applied to practical use. Since the fibers composing the bundle cable are not fused each other, they shift and make the end of the cable uneven. As a result, the light capacity of the cable is considerably reduced. Further, when a bundle cable comprising plastic fibers having a small diameter is used, the optical fibers are easily snapped or transmission loss greatly increases when the cable is covered with a thermoplastic resin.

Japanese Patent Application Laid-Open No. 265606/1987 discloses a single core plastic optical fiber using a methacrylate fluoride type copolymer and the like as a cladding material. This fiber has a relatively small transmission bandwidth so that it is only applicable to short distance signal transmission at a low speed such as audio or factory automation (FA).

On the other hand, Japanese Patent Application Laid-Open No. 53035/1993 discloses a multicore plastic fiber for signal transmission comprising 500 or more cores which are made of a transparent resin possessing a high refractive index, and have a diameter of 50 μm or less. This fiber minimizes changes in light capacity upon bending by making the core diameter 50 μm or less.

Japanese Patent Application Laid-Open No. 341147/1993 discloses an multicore type single mode optical fiber about 5 meters long which efficiently links a silica optical fiber with a light source or a light receiving element and a transmission method using the fiber. Since this fiber satisfies the single mode transmission conditions, its core diameter is quite small, 5.3 μm, when the difference of refractive indexes between the core resin and the cladding resin is 0.003 or more.

Some multicore optical fibers are put into practice as an image fiber, not as a fiber for light signal transmission. An image fiber transmits an image from one tip of the fiber to the other while maintaining a picture focused at one tip and a positional relation of optical strength patterns. Accordingly, the purpose of an image fiber is completely different from that of the light signal transmission fiber.

As described above, the conventional plastic optical fibers do not achieve simultaneously a low transmission loss at a broad transmission bandwidth and a small change in light capacity upon bending the fiber. In order to improve the conventional plastic optical fibers and develop a useful plastic optical fiber which is applicable to a middle-distance signal transmission at a high speed such as a local area network (LAN), the present inventors carried out extensive and intensive studies and accomplished the present invention.

DISCLOSURE OF THE INVENTION

The present invention relates to a multicore plastic optical fiber for light signal transmission comprising 7 or more cores having a diameter of 50 to 200 μm which are covered with a cladding resin having a refractive index lower than that of the core resin by 0.005 to 0.04.

In the present invention, the core diameter is 50 to 200 μm. When the diameter is smaller than 50 μm, transmission loss is increased or noise may occur in the case that a laser is used for a light source. When the diameter exceeds 200 μm, light loss is considerably increased on bending the optical fiber.

To increase the transmission speed, the difference of refractive indexes between the core and cladding resins must be minimized. However, when the difference is small, the light capacity is remarkably reduced when bending the fiber. In order to prevent reduction in the light capacity, the core diameter should be made small. Accordingly, the core diameter is determined by transmission speed, transmission distance in use and bending radius when wired. For example, when a 125 to 300 MHz signal is transmitted 100 meters, the preferable core diameter is 130 to 200 μm; when a 200 to 400 MHz signal is transmitted 100 meters, the preferable core diameter is 80 to 170 μm; and in the case of a high speed transmission of a signal of more than 400 MHz, the preferable core diameter is 50 to 80 μm. However, the core diameter is not limited to the above-mentioned ranges.

In order to obtain a uniform fiber cross-section, the number of cores is 7 or more which achieves stable core disposition. The preferable core number is 19 or more. For making the outer diameter of a fiber 3 mm, the core number is 4,000 or less.

The cores are preferably arranged in the closest packing structure. When the core number is relatively small, the cores positioned on the outermost periphery are preferably on the same circumference. For example, a preferable core disposition is a 7-core disposition comprising one core uniformly surrounded with 6 cores in a circle and a 19-core disposition comprising 7 cores arranged in the 7-core disposition further surrounded with 12 cores in a circle.

As the core diameter becomes smaller, the interface between the core and the cladding is more easily deteriorated or deformed due to heat and pressure caused during covering of the core, so that transmission loss is likely to increase. The preferable core number to minimize such influence is 19 or more. In the case of a multicore plastic optical fiber comprising 19 cores, the 7 inner cores and the 12 cores at the outermost layer are regarded as cores for transmission and as a protection layer, respectively. Transmission loss is deteriorated only in the outermost layer and the transmission loss of the inner 7 cores is not deteriorated even if damaging conditions have occurred during covering of the fiber.

As the core material, there can be used various transparent resins such as a methyl methacrylate type resin, a styrene type resin, a polycarbonate type resin and an amorphous polyolefin type resin. Of these, the methyl methacrylate type resin is preferable since it has high transparency so that long distance transmission can be attained.

The methyl methacrylate type resin includes a methyl methacrylate homopolymer and a copolymer containing methyl methacrylate in an amount of 50% by weight or more. The latter copolymer can be obtained by suitably selecting and copolymerizing one or more components from copolymerizable components such as acrylic esters like methyl acrylate, ethyl acrylate and n-butyl acrylate, methacrylic esters like ethyl methacrylate, propyl methacrylate and cyclohexyl methacrylate, maleimides, acrylic acid, methacrylic acid, maleic anhydride and styrene.

The styrene type resin includes a styrene homopolymer and a copolymer obtained by copolymerizing styrene, and one or more other components such as an acrylonitrile-styrene copolymer, a styrene-methyl methacrylate copolymer, a styrene-maleic anhydride copolymer and a styrene-6-membered ring acid anhydride. The styrene type resin is preferred because it is hardly affected by water due to its small hygroscopicity.

The polycarbonate type resin includes aliphatic polycarbonate and aromatic polycarbonate which are represented by the following formula (1) wherein R is represented by the following formula (2) and formula (3), respectively.

   (1)

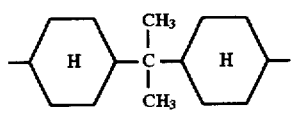   (2)

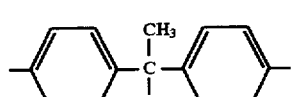   (3)

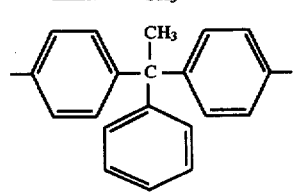

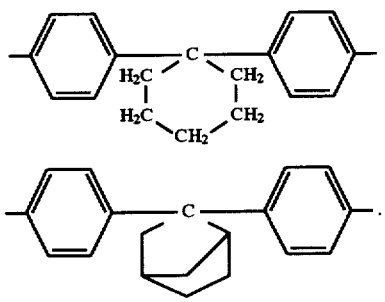

The polycarbonate type resin also includes a copolymer of the above-mentioned polycarbonates and dioxy compounds such as 4,4-dioxyphenyl ether, ethylene glycol, p-xylene glycol and 1,6-hexane diol, a hetero-bond copolymer containing ester bonds in addition to carbonate bonds, and the like. The polycarbonate type resin is preferred due to its high heat resistance and small hygroscopicity.

The amorphous polyolefin resin includes resins manufactured in Japan such as "ARTON" (trade name, manufactured by Japan Synthetic Rubber Co., Ltd.), "APO" (trade name, manufactured by Mitsui Petrochemical Industries, Ltd.) and "ZEONEX" (trade name, manufactured by Nippon Zeon Co., Ltd.). The amorphous polyolefin resin is preferred due to its excellent heat resistance.

The refractive index of the core resin is preferably 1.47 to 1.60. The melt index of the core resin is preferably 1 g/10 min. to 5 g/10 min. though it is not particularly limited if the core resin can be spun.

The refractive index of the cladding resin must be lower than that of the core resin by 0.005 to 0.04, preferably 0.01 to 0.04. When the difference of the refractive indexes is less than 0.005, the amount of light taken into the plastic optical fiber becomes too small since the refractive index of the cladding resin is too close to that of the core resin; as the result, the light cannot be detected by a light detector. When the difference of refractive indexes is more than 0.04, a sufficient transmission bandwidth cannot be obtained.

When the difference of refractive indexes of core and cladding resins is small, the light loss becomes large when bending the fiber. In the present invention, the light loss upon bending is reduced by making the core diameter 200 μm or less, and the reduction of the amount of light transmitted caused by the smaller core diameter is compensated by the multiple cores.

The melt index of the cladding resin is preferably 5 g/10 min. to 60 g/10 min, more preferably 20 g/10 min to 40 g/10 min. When the melt index is small, it is difficult to mold the resin in the shape of a fiber since the diameter is considerably changed by the high fictional resistance against the die wall. When the melt index is large, it is difficult to maintain the diameter constant at molding since the cladding resin flows toward the die head faster than the core resin.

The cladding resin is not particularly restricted if it satisfies the above conditions. The preferable cladding resin includes a resin containing the above-mentioned core resin components at a slightly different composition ratio from the composition of the above-mentioned core resin components, a resin containing at least one component of the core resin components, a resin prepared by copolymerizing or blending the core resin component(s) and at least one other components, and the like. The above-listed resins have a good adhesion property to the core resin and their other physical properties are similar to the core resin. Consequently, the reliability of the optical fiber comprising such resins is enhanced.

A cladding resin used for a fiber whose core is made of a methyl methacrylate type resin includes a methacryl type resin and/or an acrylate type resin and/or a fluorinated vinylidene type resin and other types of resins. These resins are preferred for minimizing the difference of refractive indexes of the core and cladding resins. The resins include a copolymer containing, as a main monomer, a fluorinated methacrylate such as trifluoroethyl methacrylate, tetrafluoropropyl methacrylate, pentafluoropropyl methacrylate, heptadecafluorodecyl methacrylate and octafluoropropene methacrylate, a methacrylate type monomer such as methyl methacrylate, ethyl methacrylate, propyl methacrylate and butyl methacrylate, a fluorinated acrylate such as trifluoroethyl acrylate, tetrafluoropropyl acrylate and octafluoropentyl acrylate, and an acrylate type monomer such as methyl acrylate, ethyl acrylate, propyl acrylate and butyl acrylate; a fluorinated vinylidene type copolymer; and a blend of a fluorinated vinylidene type copolymer and a methyl methacrylate type resin. Of these, the resins having a smaller refractive index than a core resin by 0.005 to 0.04 can be employed for a cladding resin.

Further, if desired, a component such as methacrylic acid, o-methylphenyl maleimide, maleimide, maleic anhydride, styrene, acrylic acid, a hexacyclic compound of methacrylic acid can be added in an amount of 5 parts by weight or less per 100 parts by weight of the copolymer composition. Specifically, the copolymer composition includes a copolymer of heptadecafluorodecyl methacrylate and methyl methacrylate; a copolymer of tetrafluoropropyl methacrylate and methyl methacrylate; a copolymer of trifluoroethyl methacrylate and methyl methacrylate; a copolymer of pentafluoropropyl methacrylate and methyl methacrylate; a copolymer of heptadecafluorodecyl methacrylate, tetrafluoropropyl methacrylate and methyl methacrylate; a copolymer of heptadecafluorodecyl methacrylate, trifluoroethyl methacrylate and methyl methacrylate; a copolymer of heptadecafluorodecyl methacrylate, trifluoroethyl methacrylate, tetrafluoropropyl methacrylate and methyl methacrylate; and the like. The composition ratio of monomers and the like are determined so as to adjust the refractive index of the cladding resin to be smaller than that of the core resin by 0.005 to 0.04. Of these, a copolymer of heptadecafluorodecyl methacrylate, trifluoroethyl methacrylate, tetrafluoropropyl methacrylate and methyl methacrylate is preferably employed in view of a balance of heat resistance, transparency, mechanical properties and other properties. The above combinations do not always necessarily include a fluorine-containing component.

The ratio of the core area to the cladding area in a cross-section of the multicore plastic optical fiber of the present invention is preferably between 9 to 1 and 4 to 6. To increase light transmission, the amount of the cladding resin is preferably minimized within a range where a transmission loss is maintained. When a third encapsulating layer is used, the ratio of the core resin to the cladding resin is between 9.8 to 0.2 and 9 to 1 and the ratio of the total area of the core and cladding to the area of the third encapsulating layer is preferably between 9 to 1 and 4 to 6.

The cross-section of the multicore plastic optical fiber of the present invention is usually substantially circular. The diameter of the cross-section is about 0.1 to 0.3 mm, generally about 0.5 to 1.0 mm.

The structure of the cross-section of the present invention can be either an "islands-in-sea" structure comprising "islands" of many cores surrounded with a "sea" of cladding as shown in FIG. 1 or an "islands-in-sea" structure comprising two-layer "islands" obtained by covering a core with a cladding which are surrounded with a "sea" of a third encapsulating layer as shown in FIG. 2.

The material of the third encapsulating layer includes polyolefin such as polyethylene, PVC, a fluorine resin, polyamide, ionomer, an ethylene-vinyl acetate copolymer, ABS, polybutylene terephthalate, a methyl methacrylate type resin, a polystyrene type resin, a polycarbonate type resin and elastomers thereof.

The multicore plastic optical fiber of the present invention can be prepared by composite spinning molten core and cladding resins so as to be an islands-in-sea structure using a special nozzle and two extruders in clean circumstances substantially free from dust.

Core and cladding resins are charged into a composite spinning die in the molten state. First, the core resin is supplied to a die plate, on which 7 or more holes are substantially uniformly arranged, and subsequently passed through thin guide tubes. Then, the molten cladding resin is charged around all the thin tubes, in which the core resin is flowing, and spun so as to be a structure comprising the cores as islands in a sea of the cladding resin. In the case that a third encapsulating layer is provided, a resin for the third layer is charged around the cladding resin. The thus-obtained fiber is stretched so as to be 1.3 to 3.0 time longer for orientation of molecules and improvement in mechanical properties, to obtain the multicore plastic optical fiber of the present invention.

The outside of the thus-obtained multicore plastic optical fiber is covered with a resin composition in order to further improve heat resistance and mechanical properties to obtain a multicore plastic optical fiber cable. As the resin composition for coating, conventional resin compositions can be used. For example, they include polyethylene, polypropylene, an ethylene-vinyl alcohol copolymer, a rubber, various types of thermoplastic elastomers, polyvinyl chloride, cross-linked polyolefin, crosslinked polyvinyl chloride, a chlorinated polyethylene compound, a polyamide resin, a fluorine resin, a polyester resin, a polyurethane resin, a silicone resin, a thermosetting resin, a ultraviolet-curing resin, and mixtures of these resins. Further, the coating layer may be reinforced by an aramide fiber, a polyacetal fiber, a ultra-high-molecular-weight polyethylene fiber, a metallic fiber and the like. The thickness of the coating layer is suitably decided according to the circumstances that the cable is actually used. Several coating layers can be provided as a multi-layer.

A preferable method for coating a plastic optical fiber with these resin compositions for coating comprises preparing a plastic optical fiber in accordance with a composite spinning method and coating the fiber with a hot-melt coating material. A plastic optical fiber is coated with a molten resin using a crosshead die, as in electric wire coating.

By preparing the multicore plastic optical fiber of the present invention so as to have the above-mentioned structure, the fiber can achieve a low loss of a light capacity at bending in spite of a small difference of the refractive indexes between the core resin and the cladding resin. The multicore plastic optical fiber of the present invention has a low transmission loss and a broad transmission bandwidth. It has a transmission bandwidth of 625 MHz·20 meters or more when measured using a light source having a launch numerical aperture of 0.25. Herein, the transmission bandwidth of 625 MHz·20 meters or more means a fiber having a length of 20 meters and a transmission bandwidth of 625 MHz or more. More preferably, the multicore plastic optical fiber of the present invention has a transmission band of 125 MHz·100 meters or more when measured using a light source having a launch numerical aperture of 0.25.

The core filaments of the multicore plastic optical fiber of the present invention are fixed in position by a cladding resin. Therefore, differing from a bundle fiber, the relative position of the core filaments of the multicore plastic optical fiber is the same at an incidence plane and an outgoing plane, and optical power distribution at the light source is high at the center and low at the peripheral part. On the other hand, a high speed photodiode having a small optical receiving diameter of about 0.4 mm requires to gather light strongly at the center of the photodiode for receiving. Accordingly, the multicore plastic optical fiber of the present invention is suitable for such a photodiode.

Differing from a bundle fiber, the multicore plastic optical fiber of the present invention can be treated as an optical fiber having one core. Therefore, it can be fixed at the end of connectors and the like by caulking coating or adhering with an adhesive agent.

Figure 1:
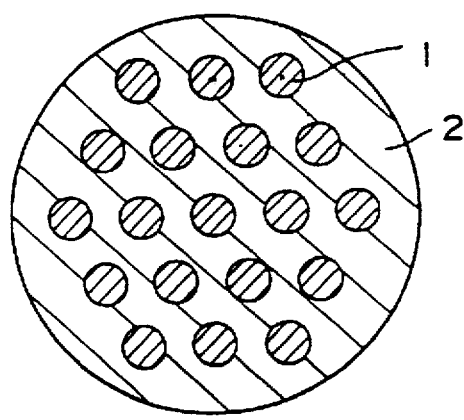
FIG. 1 is a cross-sectional view of a multicore plastic optical fiber of the present invention.
Figure 2:
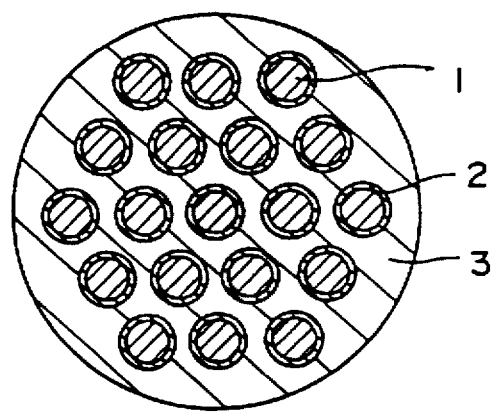
FIG. 2 is a cross-sectional view of an other multicore plastic optical fiber of the present invention.
Figure 3:
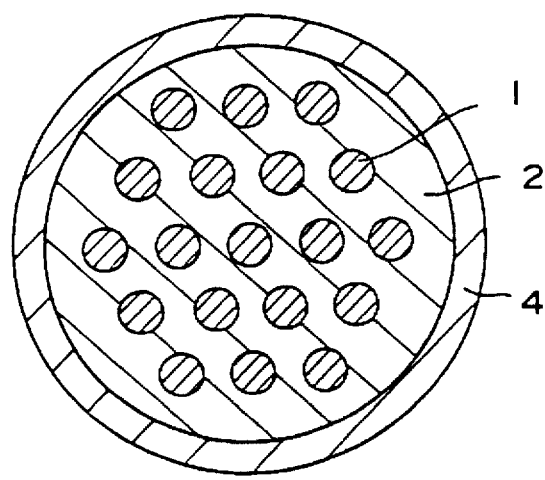
FIG. 3 is a cross-sectional view of a multicore plastic optical fiber cable of the present invention.
Figure 4:
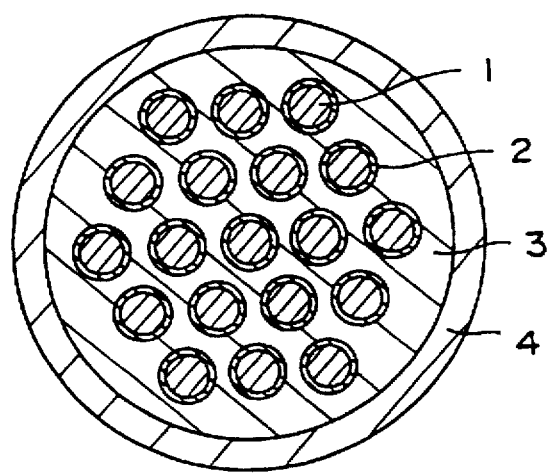
FIG. 4 is a cross-sectional view of an other multicore plastic optical fiber cable of the present invention.

The numerals used in the drawings are as follows:

1. core
2. cladding
3. third encapsulating layer
4. coating layer

BEST MODE FOR CARRYING OUT THE INVENTION

The physical properties of the multicore plastic optical fibers used in Examples and Comparative Examples are measured according to the following methods.

(1) Melt Index

Using a melt indexer (manufactured by Toyo Seiki Seisaku-sho, Ltd.), melt index was measured according to ASTM-1238 under the conditions of a test temperature of 230° C., a load of 3.8 kg, an inner diameter of the die of 2.0955 mm.

(2) Refractive Index

Using an ABBE refractometer (manufactured by ATAGO CO., LTD.), refractive index was measured with the sodium D-line in a room at a constant temperature of 23° C.

(3) Tensile Break Strength

Tensile break strength was measured according to ASTM D638 at a temperature of 23° C. at a tensile speed of 100 mm/min.

(4) Transmission Loss

Transmission loss was measured according to (i) a 52 m-2 m cutback method and (ii) a 10 m-2 m cutback method.

(i) 52 m-2 m cutback method:

Using monochromatic light having a wavelength of 650 nm as a light source, the outgoing optical power $P_{52}$ of a 52 meter-long optical fiber and the outgoing optical power $P_2$ of a 2 meter-long optical fiber were measured at an incidence opening angle of 0.15 radian, and transmission loss $\alpha_1$ per km was obtained according to the following equation:

$$\alpha_1 = 10000 log(P_2/P_{52})/(52-2) \quad [dB/km]$$

(ii) 10 m-2 m cutback method:

Using monochromatic light having a wavelength of 650 nm as a light source, the outgoing optical power $P_{10}$ of a 10 meter-long optical fiber and the outgoing optical power $P_2$ of a 2 meter-long optical fiber were measured at an incidence opening angle of 0.15 radian, and transmission loss $\alpha_1$ per km was obtained according to the following equation:

$$\alpha_1 = 10000 \times log(P_2/P_{10})/(10-2) \quad [dB/km]$$

(5) Bending Characteristics

Using a red semi-conductor laser having a wavelength of 653 nm (653 nm LD), TOLD9421 (S) manufactured by Toshiba Corporation, as light source, the transmitted light capacity of a 3 meter-long optical fiber is measured when a middle portion of the fiber is wound round a rod having a radius of 5 mm to obtain a light capacity value for comparing to the case when the fiber is not so wound.

(6) Transmission Band

The wavelength at which a transfer function shows −3 dB according to the pulse method is defined as the transmission bandwidth. The transmission band was measured based on a launch numerical aperture of 0.25, using optical fibers being 100 meter long, and 20 meter long, and a 653 nm red semi-conductor laser (653 nm LD), TOLD 9421 (S) manufactured by Toshiba Corporation as a light source.

EXAMPLES

The present invention is illustrated by reference to the following Examples, but its scope is not limited by them.

Example 1

As core resin, a methyl methacrylate having a melt flow index of 2 g/10 min. and a refractive index of 1.492 was employed. As cladding resin, a copolymer resin, having a melt flow index of 37 g/10 min. and a refractive index of 1.469, and comprising 15 parts by weight of heprodecafluorodecyl methacrylate, 5 parts by weight of trifluoroethyl methacrylate, 5 parts by weight of tetrafluoropropyl methacrylate and 75 parts by weight of methyl methacrylate, was employed. The refractive index difference was 0.023.

The core material was melted and fed to a die plate with 19 holes arranged as shown in FIG. 1 using an extruder. The holes of the die plate were arranged as follows: one at the center, 6 holes around the center hole so as to form a regular hexagon, and 12 holes around the hexagon so as to form a regular dodecagon. Then, the cladding resin was also fed to the die plate so as to surround the produced core filaments with the cladding resin, while the core filaments were bundled in a tapered die head, so as to bind the cores to obtain a multicore plastic optical fiber having an almost circular cross-section. The volume ratio of the core resin to the cladding resin was adjusted so as to be 70 to 30. The diameter of the resultant multicore plastic optical fiber was 1.0 mm, and the average diameter of the cores was 170 μm. The transmission loss of the multicore plastic optical fiber was 148 dB/km when measured according to the 52m-2 m cutback method.

The multicore plastic optical fiber was covered with low density polyethylene to obtain a multicore plastic optical fiber cable having an outer diameter of 2.2 mm. The transmission loss of the resultant multicore plastic optical fiber cable was 148 dB/km when measured according to the 52 m-2 m cutback method, which was the same value as the fiber before coating. The multicore plastic optical fiber cable exhibited satisfactory mechanical properties, i.e., a breaking load of 14 kg and breaking extension of 70%.

When the bending characteristics of the multicore plastic optical fiber cable were measured, the light capacity retention of the cable on bending was 90% of the cable which was not wound round the rod. When the transmission bandwidth was measured using a 100 m-long fiber, the cable had a broad bandwidth of 220 MHz. When the bandwidth was measured using a 20 m-long fiber, it exceeded the measurement limit of 700 MHz. The results are shown in Table 1.

When the multicore plastic optical fiber cable was subjected to a heat resistance test under dry conditions at 85° C., the transmission loss and bandwidth showed no decrease after 2000 hours.

Example 2

A multicore plastic optical fiber was prepared according to the same method as in Example 1 except that a die plate with 37 holes was employed. The holes of the die plate were arranged as follows: one at the center, 6 holes around the center hole so as to form a regular hexagon, 12 holes around the hexagon so as to form a regular dodecagon, and 18 holes around the dodecagon so as to form a regular octadecagon. The resultant multicore plastic optical fiber had a diameter of 1.0 mm. The average core diameter was 120 µm. The transmission loss of the resultant multicore plastic optical fiber was 175 dB/km when measured according to the 52 m-2 m cutback method.

The multicore plastic optical fiber was covered with low density polyethylene to obtain a multicore plastic optical fiber cable having an outer diameter of 2.2 mm. The transmission loss of the resultant multicore plastic optical fiber cable was 175 dB/km when measured according to 52 m-2 m cutback method, which was the same value as the fiber before coating.

The bending characteristics and transmission bandwidth of the multicore plastic optical fiber cable were measured. The results are shown in Table 1.

When the multicore plastic optical fiber cable was subjected to a dry heat resistance test at 85° C., the transmission loss and bandwidth showed no decrease after 2000 hours.

Example 3

A multicore plastic optical fiber was prepared according to the same method as in Example 1 except that a copolymer having a melt flow index of 39 g/10 min. and a refractive index of 1.482, and comprising 20 parts by weight of butyl acrylate, 5 parts by weight of trifluoromethacrylate and 75 parts by weight of methyl methacrylate, was employed as the cladding resin, and a die plate with 217 holes was employed. The holes of the die plate were arranged as follows: one at the center, 6 holes around the center core so as to form a regular hexagon, 12 holes around the hexagon so as to form a regular dodecagon, and 217 holes in total were arranged in 9 layers, counting the center core as one layer. The resultant multicore plastic optical fiber had a diameter of 1.0 mm, and the average core diameter was 52 µm. The transmission loss of the fiber was 270 dB/km when measured according to the 52 m-2 m cutback method.

The multicore plastic optical fiber was covered with low density polyethylene to obtain a multicore plastic optical fiber cable having an outer diameter of 2.2 mm. The transmission loss of the resultant multicore plastic optical fiber cable was 270 dB/km when measured according to the 52 m-2 m cutback method, which was the same value as the fiber before coating.

The bending characteristics and transmission bandwidth of the multicore plastic optical fiber were measured. The results are shown in Table 1.

Example 4

Using a die plate with 37 holes as employed in Example 3 and a copolymer resin having a melt flow index of 38 g/10 min. and a refractive index of 1.485, and comprising 22.5 parts by weight of butylacrylate and 77.5 parts by weight of methyl methacrylate as the cladding resin, a multicore plastic optical fiber having an almost circular cross-section was prepared. The cladding resin was fed to the die plate so that the volume ratio of the core resin to the cladding resin might be 60 to 40. The resultant multicore plastic optical fiber had a diameter of 0.5 mm, and the average core diameter was 60 µm. The transmission loss of the fiber was 198 dB/km when measured according to the 52 m-2 m cutback method.

The multicore plastic optical fiber was covered with low density polyethylene to obtain a multicore plastic optical fiber cable having an outer diameter of 2.2 mm. The transmission loss of the resultant multicore plastic optical fiber cable was 198 dB/km when measured according to the 52 m-2 m cutback method, which was the same value as the fiber before coating.

The bending characteristics and transmission bandwidth of the multicore plastic optical fiber were measured. The results are shown in Table 1.

Example 5

A multicore plastic optical fiber having 19 cores was prepared according to the same method as in Example 1 except that a copolymer having a melt flow index of 36 g/10 min. and a refractive index of 1.454, and comprising 24 parts by weight of heptadecafluorodecyl methacrylate, 8 parts by weight of trifluoromethacrylate, 8 parts by weight of tetrafluoropropyl methacrylate and 60 parts by weight of methyl methacrylate, was employed as the cladding resin. The resultant multicore plastic optical fiber had a diameter of 1.0 mm and an average core diameter was 170 µm. The transmission loss of the fiber was 150 dB/km when measured according to the 52 m-2 m cutback method.

The multicore plastic optical fiber was covered with low density polyethylene to obtain a multicore plastic optical fiber cable having an outer diameter of 2.2 mm. The transmission loss of the resultant multicore plastic optical fiber cable was 150 dB/km when measured according to the 52 m-2 m cutback method, which was the same value as the fiber before coating.

The bending characteristics and transmission bandwidth of the multicore plastic optical fiber were measured. The results are shown in Table 1.

Examples 6 and 7

A plastic optical fiber was prepared according to the same method as in Example 1 except that the conditions were changed as shown in Table 1, and its properties were measured. The results are shown in Table 1.

Comparative Example 1

As core resin, a methyl methacrylate having a melt flow index of 2 g/10 min. and a refractive index of 1.492 was employed. As cladding resin, a copolymer having a melt flow index of 37 g/10 min. and a refractive index of 1.410, and comprising 70 parts by weight of heptadecafluorodecyl methacrylate, 12 parts by weight of trifluoroethyl methacrylate, 12 parts by weight of tetrafluoropropyl methacrylate and 6 parts by weight of methyl methacrylate, was employed. The refractive index difference was 0.082.

A single-core plastic optical fiber comprising a core resin of a methyl methacrylate resin and a cladding resin of the above copolymer resin, and having an outer diameter of 1.0 mm and a core diameter of 980 µm, was prepared. The resultant plastic optical fiber was covered with low density polyethylene to obtain an plastic optical fiber cable having an outer diameter of 2.2 mm.

The transmission loss and bending characteristics of the fiber cable were measured. The results are shown in Table 1. The transmission bandwidth was relatively narrow.

Comparative Example 2

Using the core resin and the cladding resin employed in Example 1, a single-core plastic optical fiber having an outer diameter of 1.0 mm and a core diameter of 980 μm was spun. The resultant plastic optical fiber was covered with low density polyethylene to obtain a single-core plastic optical fiber having an outer diameter of 2.2 mm.

The transmission loss, bending characteristics and transmission bandwidth were measured. The results are shown in Table 1. The bending characteristics were unsatisfactory.

Comparative Example 3

Using the core resin and the cladding resin employed in Example 1, a single-core plastic optical fiber having an outer diameter of 0.25 mm and a core diameter of 240 μm was prepared. The resultant plastic optical fiber was covered with low density polyethylene to obtain a single-core plastic optical fiber having an outer diameter of 1.0 mm.

The transmission loss, bending characteristics and transmission bandwidth were measured. The results are shown in Table 1. The bending characteristics was not sufficient.

Comparative Example 4

A multicore plastic optical fiber with 217 cores was prepared according to the same method as in Example 3 except that a copolymer resin having a melt flow index of 38 g/10 min. and a refractive index of 1.489, and comprising 10 parts by weight of butyl acrylate and 90 parts by weight of methyl methacrylate, was employed as the cladding resin. The resultant multicore plastic optical fiber had a diameter of 1.0 mm and an average core diameter was 52 μm. The transmission loss of the multicore plastic optical fiber was 400 dB/km when measured according to the 10 m-2 m cutback method.

Further, the multicore plastic optical fiber was covered with low density polyethylene to obtain a multicore plastic optical fiber cable having an outer diameter of 2.2 mm. The transmission loss of the cable was 400 dB/km when measured according to the 10 m-2 m cutback method, which was the same value as the fiber before coating.

The bending characteristics and transmission bandwidth of the multicore plastic optical fiber cable were measured. The results are shown in Table 1.

Comparative Example 5

A multicore plastic optical fiber with 19 cores was prepared according to the same method as in Example 1 except that a copolymer resin having a melt flow index of 36 g/10 min. and a refractive index of 1.444, and comprising 30 parts by weight of heptadecafluorodecyl methacrylate, 10 parts by weight of trifluoroethyl methacrylate, 10 parts by weight of tetrafluoropropyl methacrylate and 50 parts by weight of methyl methacrylate, was employed as the cladding resin.

The resultant multicore plastic optical fiber had a diameter of 1.0 mm and the average core diameter was 170 μm. The transmission loss of the multicore plastic optical fiber was 150 dB/km when measured according to the 52 m-2 m cutback method.

Further, the multicore plastic optical fiber was covered with low density polyethylene to obtain a multicore plastic optical fiber cable having an outer diameter of 2.2 mm. The transmission loss of the cable was 150 dB/km when measured according to the 52 m-2 m cutback method, which was the same value as the fiber before coating.

The bending characteristics and transmission bandwidth of the multicore plastic optical fiber cable were measured. The results are shown in Table 1.

Comparative Example 6

A multicore plastic optical fiber was prepared according to the same method as in Example 1 except that a die plate with 3500 holes was employed. The 3500 holes of the die plate employed were arranged so that any three adjacent holes formed a regular triangle and the outermost holes defined a substantially circular shape, to achieve a closest packing structure.

The resultant multicore plastic optical fiber had a diameter of 3.0 mm and the average core diameter was 43 μm. The transmission loss of the multicore plastic optical fiber was 420 dB/km when measured according to the 10 m-2m cutback method.

The bending characteristics and transmission bandwidth of the multicore plastic optical fiber were measured. The results are shown in Table 1.

Comparative Example 7

A plastic optical fiber was prepared according to the same method as in Comparative Example 6 except that the conditions of Comparative Example 6 were changed as shown in Table 1, and its properties were measured. The results are shown in Table 1.

Industrial Applicability

The multicore plastic optical fiber for light signal transmission of the present invention has broader transmission bandwidth and a lower transmission loss and exhibits more excellent bending characteristics compared to conventional plastic optical fibers. The multicore plastic optical fiber of the present invention can transmit light signals in short and medium distances at a high speed. Accordingly, the multicore plastic optical fiber of the present invention is suitable for information transmission such as LAN, FA, OF and computer networks

TABLE 1

| | Outer diameter of fiber μm | Core diameter μm | Core number | Refractive Index n | | | Transmission loss dB/km | Bending characteristics % | Transmission bandwidth | |
| | | | | Core | Cladding | Δn | | | 100 m measurement MHz | 20 m measurement MHz |
| --- | --- | --- | --- | --- | --- | --- | --- | --- | --- | --- |
| Example | | | | | | | | | | |
| 1 | 1000 | 170 | 19 | 1.492 | 1.469 | 0.023 | 148 | 90 | 220 | >700 |
| 2 | 1000 | 120 | 37 | 1.492 | 1.469 | 0.023 | 175 | 96 | 220 | >700 |

TABLE 1-continued

| | Outer diameter of fiber μm | Core diameter μm | Core number | Refractive Index n | | | Transmission loss dB/km | Bending characteristics % | Transmission bandwidth | |
|---|---|---|---|---|---|---|---|---|---|---|
| | | | | Core | Cladding | Δn | | | 100 m measurement MHz | 20 m measurement MHz |
| 3 | 1000 | 52 | 217 | 1.492 | 1.482 | 0.010 | 270 | 90 | 400 | >700 |
| 4 | 500 | 60 | 37 | 1.492 | 1.485 | 0.007 | 198 | 85 | 500 | >700 |
| 5 | 1000 | 170 | 19 | 1.492 | 1.454 | 0.038 | 150 | 95 | 130 | 650 |
| 6 | 670 | 114 | 19 | 1.492 | 1.469 | 0.023 | 147 | 96 | 220 | >700 |
| 7 | 500 | 85 | 19 | 1.492 | 1.469 | 0.023 | 173 | 96 | 210 | >700 |
| Comparative Example | | | | | | | | | | |
| 1 | 1000 | 980 | 1 | 1.492 | 1.410 | 0.082 | 140 | 83 | 85 | 400 |
| 2 | 1000 | 980 | 1 | 1.492 | 1.469 | 0.023 | 145 | 25 | 210 | >700 |
| 3 | 250 | 240 | 1 | 1.492 | 1.469 | 0.023 | 200 | 70 | 210 | >700 |
| 4 | 1000 | 52 | 217 | 1.492 | 1.489 | 0.003 | 400 | 60 | | >700 |
| 5 | 1000 | 170 | 19 | 1.492 | 1.444 | 0.048 | 150 | 95 | 100 | 500 |
| 6 | 3000 | 43 | 3500 | 1.492 | 1.469 | 0.023 | 420 | >96 | | >700 |
| 7 | 1000 | 15 | 3500 | 1.492 | 1.469 | 0.023 | 480 | >96 | | >700 |

We claim:

1. A multicore plastic optical fiber for light signal transmission comprising 7 or more cores having a diameter of 50 to 200 μm which are covered with a cladding resin having a refractive index lower than that of the core resin by 0.005 to 0.04.

2. The multicore plastic optical fiber for light signal transmission according to claim 1, wherein the transmission bandwidth is 625 MHz·20 m or more when measured using a light source having a launch numerical aperture of 0.25.

3. The multicore plastic optical fiber for light signal transmission according to claim 1, wherein the transmission bandwidth is 125 MHz·100 m or more when measured using a light source having a launch numerical aperture of 0.25.

4. The multicore plastic optical fiber for light signal transmission according to claim 1, wherein the core resin is a methyl methacrylate type resin.

* * * * *